United States Patent
Takimoto et al.

(10) Patent No.: US 12,509,753 B2
(45) Date of Patent: Dec. 30, 2025

(54) Fe—Ni—Cr ALLOY HAVING SUPERIOR CORROSION RESISTANCE, WELDABILITY, AND OXIDATION RESISTANCE

(71) Applicant: Nippon Yakin Kogyo Co., Ltd., Tokyo (JP)

(72) Inventors: Kazuhito Takimoto, Kawasaki (JP); Tomofumi Fukuyama, Kawasaki (JP); Murotsune Yabe, Kawasaki (JP)

(73) Assignee: NIPPON YAKIN KOGYO CO., LTD., Tokyo (JP)

( * ) Notice: Subject to any disclaimer, the term of this patent is extended or adjusted under 35 U.S.C. 154(b) by 404 days.

(21) Appl. No.: 18/019,974

(22) PCT Filed: Dec. 20, 2021

(86) PCT No.: PCT/JP2021/047056
§ 371 (c)(1),
(2) Date: Feb. 6, 2023

(87) PCT Pub. No.: WO2022/138572
PCT Pub. Date: Jun. 30, 2022

(65) Prior Publication Data
US 2023/0287550 A1    Sep. 14, 2023

(30) Foreign Application Priority Data
Dec. 23, 2020 (JP) .................. 2020-213742

(51) Int. Cl.
*C22C 38/54* (2006.01)
*C21C 7/068* (2006.01)
(Continued)

(52) U.S. Cl.
CPC .............. *C22C 38/54* (2013.01); *C21C 7/068* (2013.01); *C22C 38/001* (2013.01);
(Continued)

(58) Field of Classification Search
None
See application file for complete search history.

(56) References Cited

U.S. PATENT DOCUMENTS

2007/0299278 A1* 12/2007 Hechler .................. C07C 5/333
585/654
2017/0058384 A1    3/2017 Todoroki et al.

FOREIGN PATENT DOCUMENTS

EP    3 178 958 A1    6/2017
EP    3 467 137 A1    4/2019
(Continued)

OTHER PUBLICATIONS

Mar. 1, 2022 International Search Report issued in Patent Application No. PCT/JP2021/047056.
(Continued)

*Primary Examiner* — George Wyszomierski
(74) *Attorney, Agent, or Firm* — Oliff PLC

(57) ABSTRACT

An Fe—Ni—Cr alloy contains, in mass %, from 0.001% to 0.050% of C, from 0.18% to 1.00% of Si, from 0.20% to 0.80% of Mn, 0.030% or less of P, 0.0001% to 0.0020% of S, from 12% to 21% of Ni, from 18% to 24% of Cr, from 0.20% to 1.50% of Mo, 0.30% or less of Cu, from 0.10% to 0.70% of Al, from 0.10% to 0.70% of Ti, from 0.002% to 0.015% of N, from 0.0001% to 0.0010% of B, from 0.0002% to 0.0030% of O, 0.002% or less of Ca, and from 0.0010% to 0.0150% of REM in total, said REM being composed of one or more elements selected from among La, Ce and Y, with the balance being made up of Fe and unavoidable impurities, and which satisfies formulae 1 and 2.

$$0.575x\text{Ni}+1.25x\text{Cr}+3.43x\text{Mo}-39x\text{P}-5.3x\text{Al}-641x\text{REM}-1018x\text{O} \geq 20.0 \qquad \text{Formula 1}$$

$$1.5x\text{Mn}+41.3x\text{Si}+1469x\text{S}-1.67x\text{Al}-1.34x\text{Ti}-150x\text{O}-620x\text{REM} \geq 5.0 \qquad \text{Formula 2.}$$

5 Claims, 2 Drawing Sheets

(51) Int. Cl.
    *C22C 38/00*     (2006.01)
    *C22C 38/02*     (2006.01)
    *C22C 38/04*     (2006.01)
    *C22C 38/06*     (2006.01)
    *C22C 38/42*     (2006.01)
    *C22C 38/44*     (2006.01)
    *C22C 38/50*     (2006.01)

(52) U.S. Cl.
    CPC .......... *C22C 38/002* (2013.01); *C22C 38/005* (2013.01); *C22C 38/02* (2013.01); *C22C 38/04* (2013.01); *C22C 38/06* (2013.01); *C22C 38/42* (2013.01); *C22C 38/44* (2013.01); *C22C 38/50* (2013.01)

(56) References Cited

FOREIGN PATENT DOCUMENTS

| | | |
|---|---|---|
| JP | H06-330226 A | 11/1994 |
| JP | 2004-197122 A | 7/2004 |
| JP | 2014-084493 A | 5/2014 |

OTHER PUBLICATIONS

Mar. 26, 2025 extended Search Report issued in European Patent Application No. 21910716.6.

\* cited by examiner

Fe—Ni—Cr ALLOY HAVING SUPERIOR CORROSION RESISTANCE, WELDABILITY, AND OXIDATION RESISTANCE

TECHNICAL FIELD

The present invention relates to Fe—Ni—Cr alloys having superior corrosion resistance, weldability, and oxidation resistance and being the most suitable for a sheathed heater.

BACKGROUND ART

Sheathed heaters using a nichrome wire are widely used for a heat source of electric cooking devices and electric water heaters. Sheathed heaters have a leak-tight structure which is heated by electrifying and generally manufactured by welding both ends of a strip-shaped plate of a metallic material in a tubular cladding tube and filling a nichrome wire and a magnesia powder and the like in the cladding tube. Since sheathed heaters can be heated only by electrifying without using fire, they are highly safe and the demand thereof is growing in recent years.

However, the product life of sheathed heaters is highly influenced by oxidation resistance, corrosion resistance, and presence or absence of surface defects at welding portions. If a hole opens or a crack is formed in a metallic cladding tube, disconnection of a nichrome wire installed therein will be caused and function as a heating element will be lost.

In characteristics which influences the product life, oxidation resistance is important. The surface temperature of a cladding tube rises by electrifying a nichrome wire. If a metal having low oxidation resistance is used, oxidation of the metal proceeds in a greatly high rate by the rise of the surface temperature, and the oxide film may easily peel. As the result of oxidation proceeding and peeling of the oxide film, the metallic portion of the cladding tube causes weight loss and causes hole opening and cracking.

Corrosion resistance is one of important characteristic which influences the product life of sheathed heaters. Even if it is a metallic material with superior oxidation resistance, if the corrosion resistance is insufficient, corrosion proceeds in an early stage of starting use in wet environments, and it causes hole opening and cracking.

Ordinary, there is no home appliance in which a heater used in wet environments is used in high temperature applications which require oxidation resistance. However, in order to satisfy the requirement of cost down from market, attempt of decreasing design and production cost by using the same design has been carried out, so that materials which cope with the attempt are required.

Furthermore, the surface condition of welding portions also influences the product life of sheathed heaters. A sheathed heater product is formed in a small diameter tube by rolling up a strip-shaped plate into a tubular shape and continuously welding. Although unevenness formed at a welding portion in welding is generally removed by grinding, man-hours are required to completely remove, and the productivity is greatly decreased. If these defects are not removed and remained, bending crack may occur in the product forming process. Even if bending crack does not occur, corrosion resistance and oxidation resistance in use are decreased, it will be a cause of shorting the product life. Therefore, it is preferable that there is no defect after welding and grinding is almost not required.

As a material for cladding tube of sheathed heaters, Alloy 84 and Alloy 800 with corrosion resistance have been conventionally used. As a metallic material which improves corrosion resistance, Patent Document 1 discloses austenitic Fe—Ni—Cr alloys for cladding tube having not only superior corrosion resistance in a base material and welding portions but also superior formability of the welding portions.

However, these materials are for improving corrosion resistance in wet environments, and though corrosion resistance and formability of the welding portions are considered, oxidation resistance which greatly influences the product life and is evaluated by a cycle test in which, specifically, room temperature and high temperature at about 1000° C. are repeated is not considered. Therefore, the characteristics are not sufficient for metallic cladding tubes in various environments which require corrosion resistance in wet environments and oxidation resistance in which high temperature and low temperature are repeated.

Patent Document 2 suggests inexpensive alloys for cladding tube of sheathed heater, which are superior in blackening and weldability, and surface flaw unlikely occurs. In order to form a black protection film having superior emissivity, while adding Al and Ti, and considering influence of surface flaw in production, amount of Al+Ti is decided. However, though improvement of characteristics such as blackening, surface flaw, and emissivity are considered, oxidation resistance which endures the oxidation test in which high temperature and low temperature are repeated is not considered, the characteristics of the alloys are not sufficient for alloys for sheathed heater. Furthermore, regarding corrosion resistance, influence of precipitates caused by additive elements is not considered, the alloys cannot be used in high corrosive atmosphere, and the characteristics are insufficient for metallic cladding tubes.

Patent Document 3 suggests multi-layer steels in which Al, Si, Ca, Y, La, and Ce are added, thereby improving high-temperature corrosion resistance. These materials are superior in corrosion resistance and have superior high-temperature corrosion resistance against chlorides and hydrogen chloride gas in combustion environments. However, in other environments, such as wet environments, corrosion resistance is insufficient caused by bad influence of Al, La, Ce, Y, Ca and the like. Furthermore, weldability is not examined and it may be insufficient due to bad influence of Al, La, Ce, Y, and Ca and the like. Moreover, since the production method is sintering an alloy powder, the productivity is low, and it may be difficult to apply to alloys for sheathed heaters as in the present The Patent documents are as follows.

Patent document 1: Japanese Unexamined Patent Application Publication No. 2014-84493
Patent document 2: Japanese Unexamined Patent Application Publication No. 2004-197122
Patent document 3: Japanese Unexamined Patent Application Publication No. Heisei 6-330226

SUMMARY OF INVENTION

The present invention has been made in view of the above-described problems of the prior arts. An object of the present invention is to provide Fe—Ni—Cr alloys having superior oxidation resistance, corrosion resistance, and weldability which are necessary for a cladding tube of a sheathed heater, and to provide materials which are usable in both wet environment and high temperature environment with one material, those efforts have begun in recent years.

Means for Solving the Problem

In order to solve the above problems, the inventers have made extensive studies. Oxidation resistance evaluated by cycle test that repeats from room temperature to 1000° C. is a characteristic which highly influences product life of sheathed heaters. Therefore, the inventers have made research about elements that improve oxidation resistance and elements that reduce oxidation resistance. As a result, the inventers have found that adding La, Ce, and Y is greatly effective for improving oxidation resistance and that Si, Ni, and Al are also effective as other elements. On the other hand, it became clear that improvement of oxidation resistance is lost when B, N, and S are contained and the product life of a sheathed heater is shortened. Specifically, if amount of B is increased, the bad influence became prominent. Also, it was confirmed that control of amount of Si, Ni, Al, B, N, and S is necessary to ensure oxidation resistance when La, Ce, and Y are added.

Furthermore, it became clear that La, Ce, and Y which are added to improve oxidation resistance form oxide inclusions and phosphorus compounds with O and P and reduce corrosion resistance necessary for characteristic of a sheathed heater in wet environment including ion chloride. After detailed investigation of the cause of the decrease in corrosion resistance, it was revealed that the oxygen compounds and phosphorus compounds were preferentially dissolved over the base material, which was thought to be a starting point of pitting corrosion. In order to improve corrosion resistance, it was found that composition balance of Ni, Cr, Mo, P, Al, Ca, O in addition to La, Ce, Y must be controlled in the optimal range to secure corrosion resistance of the base material, and formation of oxygen compounds and phosphorus compounds must be suppressed. That is, it is important that the oxygen concentration is kept low by suitably adding Al, thereby effectively solid-solving La, Ce, and Y in the alloy and controlling so as to sufficiently demonstrate the effects of these elements. Moreover, by adding Al to promote deoxidation, it is possible to desulfurize and control the sulfur concentration within a suitable range. However, if the oxygen concentration is too low, CaO is reduced from the molten slag during smelting and Ca-containing oxides are formed in the alloy. It was found that this easily dissolves in wet environments in which a sheathed heater is used and becomes a starting point of pitting corrosion, thereby reducing the corrosion resistance.

When Fe—Ni—Cr alloys containing La, Ce, and Y are welded, the shape of the weld bead deteriorates and unevenness is formed in the bead portion. If the bead portion is not ground, it may lead to bending cracks during product processing, and even if it does not crack during processing, it may reduce oxidation resistance during use or become a starting point of pitting corrosion. After detailed investigation of the relationship between the shape of the bead portion and the composition of the base material, it was found that the degree of shape deterioration is correlated with the added amount of La, Ce, Y, Si, Mn, S, Al, Ti, and O, and by adjusting the balance of these compositions, the shape of the bead portion can be controlled to a satisfactory level. It was also found that, temper-color coloring can be effectively inhibited by controlling the balance of the amount of Al and Ti in REM (Rare Earth Metal) contained material.

The present invention has been made based on the above knowledge, the summary is as follow.

That is, the present invention is an Fe—Ni—Cr alloy consisting of: in weight %, C: 0.001 to 0.050%, Si: 0.18 to 1.00%, Mn: 0.20 to 0.80%, P: 0.030% or less, S: 0.0001 to 0.002%, Ni: 12 to 21%, Cr: 18 to 24%, Mo: 0.20 to 1.50%, Cu: 0.30% or less, Al: 0.10 to 0.70%, Ti: 0.10 to 0.70%, N: 0.002 to 0.015%, B: 0.0001 to 0.0010%, O: 0.0002 to 0.003%, Ca: 0.002% or less, total amount of at least one of La, Ce, and Y (REM): 0.0010 to 0.0120%, Fe as a remainder, and inevitable impurities, wherein the composition satisfies the following Formulas 1 and 2 (in Formulas, the notation of each element means the content (by weight %) of the element in the Fe based alloy).

$$0.575x\text{Ni}+1.25x\text{Cr}+3.43x\text{Mo}-39x\text{P}-5.3x\text{Al}-641x\text{REM}-1018x\text{O} \geq 20.0 \qquad \text{(Formula 1)}$$

$$1.5x\text{Mn}+41.3x\text{Si}+1469x\text{S}-1.67x\text{Al}-1.34x\text{Ti}-150x\text{O}-620x\text{REM} \geq 5.0 \qquad \text{(Formula 2)}$$

In the present invention, the alloy preferably contains REM oxides, Ti nitrides, Ti carbonitrides, Ca—Al oxides, and Mg oxides, and the area ratio in any cross section of the alloy is 0.50% or less.

In the present invention, the composition preferably satisfies the following Formulas 3 and 4 (in Formulas, the notation of each element means the content (by weight %) of the element in the Fe based alloy).

$$\text{Al}-1.1x\text{Ti} \geq 0 \qquad (3)$$

$$0.4x\text{Si}+1.7x\text{Ni}+1.1x\text{Cr}+5.4x\text{Al}+3.2x\text{Ti}+4923x\text{REM}-2425x\text{B}-744x\text{N}-1213x\text{S} \geq 49.0 \qquad (4)$$

The present invention is a producing method for the Fe—Ni—Cr alloy according to claim 1, the method comprising: adjusting composition of the alloy by smelting after dissolving an alloy raw material, the smelting comprising: decarburizing by blowing a mixture gas of oxygen and argon to a dissolved alloy raw material (molten alloy), thereby controlling nitrogen concentration at 0.002 to 0.015 weight %; chromium reducing; adding aluminum, limestone, and fluorite to the molten alloy, thereby forming CaO—SiO$_2$—Al$_2$O$_3$—F based slag and adjusting oxygen concentration at 0.0002 to 0.030 weight %; and adding at least one of La, Ce, and Y to the molten alloy.

The present invention is a sheathed heater comprising a cladding tube consisting of the above Fe—Ni—Cr alloy.

Effect of the Invention

According to the present invention, Fe—Ni—Cr alloys having superior oxidation resistance, corrosion resistance, and weldability that are necessary for a cladding tube of a sheathed heater and producing method of the same can be provided.

EMBODIMENT FOR CARRYING OUT THE INVENTION

Figure 1:
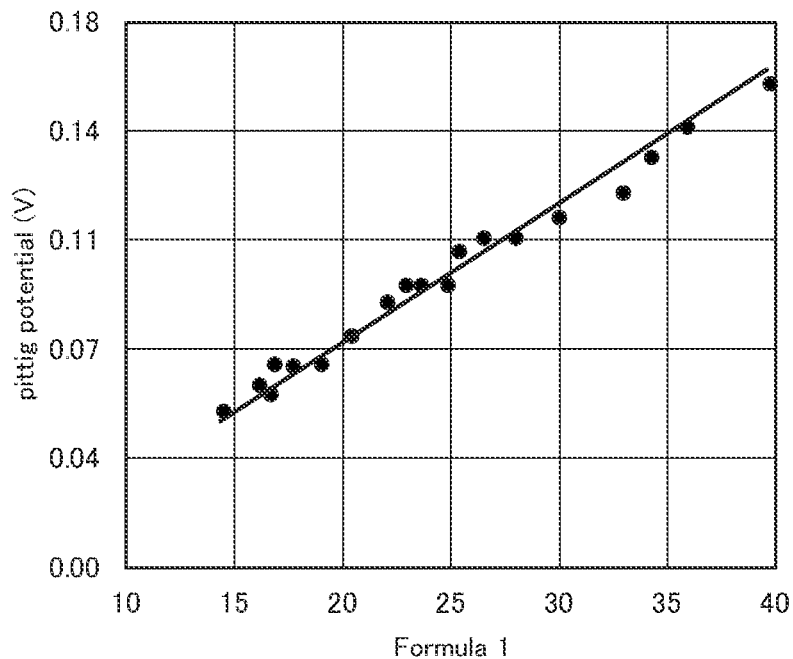
FIG. 1 is a graph showing the relationship between Formula 1 showing the effect of chemical composition on corrosion resistance and pitting potential.
Figure 2:
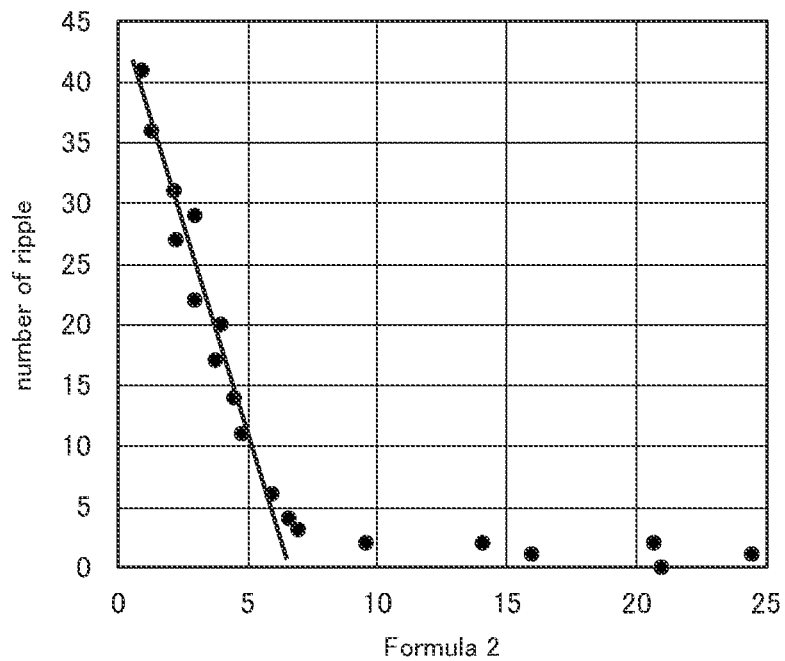
FIG. 2 is a graph showing the relationship between the number of ripples and Formula 2 showing the effect of chemical composition on weldability.

Next, embodiment of the present invention is specifically explained. It should be noted that the unit for the content of each element in the composition of the Fe—Ni—Cr alloy and the composition of the melted alloy raw material (molten alloy) is "weight %", and is indicated simply by "%" unless otherwise specified.

C: 0.001 to 0.050%

C in the alloy is an element to stabilize an austenite phase. Since C has the effect of increasing the alloy strength by solid solution strengthening, in order to maintain strength at normal temperatures and high temperatures, it must be contained in at least 0.001%. On the other hand, C generates carbides with Cr which is highly effective in improving corrosion resistance and generate a Cr depletion layer therearound, causing reduction in corrosion resistance. Therefore, the upper limit of C must be 0.050%. It is desirably 0.002 to 0.045%, and more desirably 0.002 to 0.040%.

Si: 0.18 to 1.00%

Si in the alloy improves adhesion between an oxide film and a base material and is effective element to stably form the film. In addition, Si improves melting and melt metal flowability during welding, and prevention of formation of large ripples, and therefore, the lower limit of Si must be 0.18%. On the other hand, excessive addition may be cause of generation of surface defects caused by inclusions, and therefore, the upper limit of Si must be 1.00%. Desirable amount of Si is 0.20 to 0.95% and more desirable amount is 0.22 to 0.90%.

Mn: 0.10 to 2.00%

Mn in the alloy is an element which stabilize an austenite phase and necessary element to perform deoxidation. Furthermore, Mn adheres excessive S during welding and has the effect of preventing weld crack. In addition, Mn has the effect of reducing ripples on a surface of a weld bead. Therefore, the lower limit of Mn must be 0.2%. However, since excessive addition leads to deterioration of oxidation resistance and corrosion resistance, the upper limit of Mn must be 0.80%. Desirable mount of Mn is 0.23 to 0.75% and more desirable amount is 0.25 to 0.70%.

P: 0.03% or Less

P in the alloy is a harmful element since it forms compounds with La, Ce, and Y, and deteriorates corrosion resistance, and therefore, the upper limit of P must be 0.030%. Desirable amount of P is 0.26% or less and more desirable amount is 0.022% or less.

S: 0.0001 to 0.0020%

S in the alloy has the effect of improving melt metal flowability during welding and has the effect of reducing the risk of fusion defect and inclusion of slag, and the effect of preventing formation of large ripples. On the other hand, S in the alloy segregates grain boundaries and forms low-melting point compounds, thereby inviting hot tearing during production process, and productivity is greatly reduced. Furthermore, S reduces adhesion between an oxide film and a base material, thereby dropping off the oxide film and promoting oxidation. Since S is a harmful element for oxidation resistance, the amount must be 0.0001 to 0.0020%. Desirable amount is 0.0002 to 0.0015% and more desirable amount is 0.0003 to 0.0010%.

Ni: 15 to 50%

Ni in the alloy is a stabilizing element of an austenite phase and improves oxidation resistance and high temperature strength. In order to maintain stability, oxidation resistance, and high temperature strength of the structure, the lower limit is 1 set at 12% or more. On the other hand, excessive addition causes reduction of blackening properties and increase of the raw material cost. Therefore, the upper limit of addition is set at 21%. Desirable amount is 12.5 to 20.0% and more desirable amount is 13.0 to 19.5%.

Cr: 18 to 24%

Cr in the alloy is the effective element for improving corrosion resistance in wet environments, inhibits corrosion in high temperature environments, and has the effect of improving oxidation resistance. In order to ensure corrosion resistance and oxidation resistance, the lower limit is set at 18%. On the other hand, since excessive amount reduces stability of the austenite phase, it may lead to decrease of corrosion resistance, the upper limit is set at 24%. Desirable amount is 18.5 to 23.4% and more desirable amount is 19.0 to 22.5%.

Mo: 0.20 to 1.50%

Mo in the alloy has the effect of highly improving corrosion resistance in wet environments by even a small addition. Therefore, the lower limit is set at 0.20%. However, in excessive addition, Mo in the alloy may preferentially oxidizes and the oxide film may peels in an intermediate heat treatment in a production process of sheathed heaters, and it may have adverse effects. Therefore, the upper limit is set at 1.50%. Desirable amount is 0.25 to 1.40% and more desirable amount is 0.30 to 1.30%.

Cu: 0.30% or Less

Cu in the alloy has the effect of stabilizing an austenite phase and softening material strength. However, since excessive addition leads to cracks in welding, the upper limit is set at 0.30%. Desirable upper limit of the amount is 0.25% and more desirable amount is 0.20%.

Al: 0.10 to 0.80%

Al in the alloy is an element that added for a deoxidizing material, and is important element for controlling the oxygen content within 0.0002 to 0.0030% according to Formula (1).

$$2\underline{Al} + 3\underline{O} = (Al2O3) \tag{1}$$

Underlines represent elements in molten steel, and parentheses represent elements in slag.

By using CaO—SiO$_2$—Al$_2$O$_3$—MgO—F based slag in smelting the steel of the present invention, generated alumina can be effectively absorbed and the concentration of oxygen can be controlled. Moreover, since deoxidizing progresses, the concentration of S in molten steel decreases according to Formula (2).

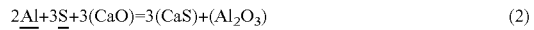

$$2\underline{Al} + 3\underline{S} + 3(CaO) = 3(CaS) + (Al_2O_3) \tag{2}$$

This makes the concentration of S can be controlled within the present invention of 0.0001 to 0.0020%. Therefore, Al must be 0.10% or more. Since Al is an element for promoting formation of dense films, thereby improving oxidation resistance, and suppressing discoloration during welding of REM containing materials, Al must be 0.10% or more. On the other hand, excessive addition of Al increases the Ca concentration beyond 0.002% according to Formula (3).

$$3(CaO) + 2\underline{Al} = (Al_2O_3) + 3\underline{Ca} \tag{3}$$

Furthermore, excessive addition of Al leads to combine with nitrogen in the alloy and forms large amount of nitrides, and causes surface flaws and increase weld bead ripple. When combining with oxygen, it be large inclusions and causes decrease of oxidation resistance, and therefore, the upper limit must be 0.70%. Desirable amount is 0.13 to 0.68% and more desirable amount is 0.15 to 0.65%.

Ti: 0.10 to 0.70%

Since Ti in the alloy is an element promoting to form dense films and effectively improving oxidation resistance, the lower limit is set at 0.10%. On the other hand, excessive addition of Ti leads to combine with nitrogen in the alloy and forms large amount of nitrides, and causes surface flaws. Furthermore, excessive addition enlarges weld bead ripple and promotes discoloration during welding of REM containing materials. Therefore, the upper limit is set at 0.70%. Desirable amount is 0.13 to 0.65% and more desirable amount is 0.15 to 0.60%.

N: 0.003 to 0.025%

Since N is an element increasing mechanical characteristics and has the effect of stabilizing an austenite phase. Therefore, the lower limit of N is set at 0.00N. On the other hand, N forms nitrides with Al and Ti, which not only causes surface flaw, but also reduces oxidation resistance, which is the effect of Al and Ti. Therefore, the upper limit is set at 0.015%. Desirable amount is 0.003 to 0.013% and more desirable amount is 0.004 to 0.012%. In order to control the amount of N within the range of the present invention, a mixture gas of Ar and oxygen is blown in the molten steel of the present invention in smelting, N in molten steel decreases N according to Formula (4) during generating CO gas in a decarburization step, whereby it can be controlled within the range of the present invention.

$$2N = N_2(g) \tag{4}$$

B: 0.0001 to 0.0010%

B in the alloy is an element improving hot workability and has the effect of decreasing hot rolling cracks and surface flaw. Therefore, the lower limit is set at 0.0001%. However, B makes the oxide scale of the alloy porous and decreases the oxidation resistance. Therefore, the upper limit of is set at 0.0010%. Desirable amount is 0.0002 to 0.0009% and more desirable amount is 0.0003 to 0.0008%.

O: 0.0002 to 0.0030%

O in the alloy combines with Al, Ti, Si, La, Ce, and Y in a molten steel and forms oxides, causes surface flaw and degree of oxidation resistance, and enlarges weld bead ripple. Therefore, a low oxygen concentration of 0.0030% or less is desirable. Furthermore, since by combining O with Al, Ti, Si, La, Ce, and Y, it becomes a cause of impairing the useful effects of those elements, oxidation resistance, and the like, the upper limit is set at 0.0030%. In order to achieve this range, deoxidation should be performed by controlling Al to the concentration of the present invention as described above. On the other hand, if the amount of O in the alloy is reduced too much, the Ca concentration will exceed 0.002% according to Formula (3). Therefore, the lower limit is set at 0.0002%. Desirable amount is 0.0003 to 0.0027% and more desirable amount is 0.0005 to 0.0025%.

Ca: 0.002% or Less

Ca is an element mixed from CaO in the slag as described above in the alloy of the present invention. Since Ca forms a large amount of Ca—Al oxide-based inclusions and reduce oxidation resistance, it must be kept low. As described above, for this purpose, it is necessary to control the Al concentration to 0.10 to 0.70% and the oxygen concentration to 0.0002 to 0.0030%. Therefore, Ca should be 0.002% or less.

Total amount of at least one of La, Ce, and Y (REM): 0.0010 to 0.0150%

Since La, Ce, and Yin the alloy have effects of increase adhesion between the oxide film and the base material alloy and highly improving oxidation resistance, the lower limit is set at 0.0010%. On the other hand, La, Ce, and Y combine with O and P to form oxides and phosphorus compounds, which greatly reduce the corrosion resistance. Furthermore, excessive addition of La, Ce, and Y deteriorates the shape of the bead portion during welding, it causes unevenness in the bead portion. These deteriorations in corrosion resistance and weldability greatly shorten the life of the sheathed heater as a product, to the extent that they cancel out the effect of improving the oxidation resistance due to addition. Therefore, the upper limit is set at 0.0150%. Desirable amount is 0.0015 to 0.0140 and more desirable amount is 0.0020 to 0.0130%.

$$0.575x\text{Ni} + 1.25x\text{Cr} + 3.43x\text{Mo} - 39x\text{P} - 5.3x\text{Al} - 641x\text{REM} - 1018x\text{O} \geq 20.0 \tag{Formula 1}$$

Formula 1 expresses the degree of influence of elements that affect the corrosion resistance of materials to which REM is added by regression analysis as a formula. As described above, La, Ce, and Y form oxide-based inclusions and phosphorus compounds, which are starting points of pitting corrosion and lead to decrease of corrosion resistance. Therefore, it is necessary to suppress forming of oxide-based inclusions and phosphorus compounds and secure corrosion resistance of the base material by Ni, Cr, and Mo. Furthermore, not only La, Ce, and Y, but also Al oxide-based inclusions reduce corrosion resistance. Therefore, as described above, it is desirable to reduce the Al content as much as possible. Therefore, the low limit is set at 20.0. Desirable range is 23.0 or more and more desirable range is 26.0 or more.

$$1.5x\text{Mn} + 41.3x\text{Si} + 1469x\text{S} - 1.67x\text{Al} - 1.34x\text{Ti} - 150x\text{O} - 620x\text{REM} \geq 5.0 \tag{Formula 2}$$

Formula 2 expresses the degree of influence of the elements that affect the surface unevenness of the weld bead of the alloy to which REM is added by regression analysis as a formula. Si and S are elements that improve weld-penetration and melt flow during welding, and Mn has the effect of preventing weld cracks. By adding these elements, not only the occurrence of cracks after welding, but also the unevenness of the surface of the weld bead portion were reduced. On the other hand, Al and Ti form oxides and nitrides and La, Ce, and Y form oxides and phosphorus compounds with oxygen and phosphorus, and enlarge unevenness in surface bead portion. Therefore, the lower limit of these elements is set at 5.0. Desirable lower limit is 7.0 and more desirable lower limit is 10.0.

Composition and Area Rate of Compounds

The compounds included in the alloy are REM oxides, Ti nitrides, and Ti carbonitrides, the REM oxides contain 1% or less of Ni, P, Si, and S. As others, Al—Ca oxides and Mg oxides are slightly contained. Since these compounds become starting points of corrosion generation, the area ratio of the cross section must be extremely small at 0.50% of less. The smaller the better, preferably 0.40% or less, more preferably 0.30% or less. In order to achieve this, it is necessary to control the oxygen concentration to an appropriate range in conjunction with the above control of the Al concentration, and control of Ca concentration. That is, when the oxygen concentration is 0.0002 to 0.0030% by controlling the Al concentration to 0.10 to 0.70%, La, Ce, and Y are effectively solid-solved in the alloy, and the effects thereof are sufficiently demonstrated and the Ca concentration does not become high and, whereby the corrosion resistance is not deteriorated. Furthermore, as described above, a mixture gas of Ar and oxygen is blown in a decarburization step during generating CO gas, N in the molten steel of the present invention is controlled to the range of the present invention of 0.002 to 0.015%, and the Ti concentration is controlled to 0.10 to 0.70%, whereby the Ti nitrides and Ti carbonitrides can be controlled to be small. That is, the compounds formed in the alloy can be satisfied the required characteristics by controlling the concentration of Al, Ti, N, and O.

$$\text{Al} - 1.1x\text{Ti} \geq 0 \tag{Formula 3}$$

Formula 3 is a relational expression for control of the coloring of weld beads, that is shade of temper color, in the alloys contained REM. By adjusting the constituent elements of the oxide film, the color becomes lighter and the subsequent removal becomes easier. Therefore, the value must be 0 or more. Desirable value is 0.02 or more and more desirable value is 0.05 or more.

$$0.4xSi+1.7xNi+1.1xCr+5.4xAl+3.2xTi+4923xREM-2425xB-744xN-1213xS \geq 49.0 \quad \text{Formula 4}$$

Formula 4 expresses the degree of influence of elements that influence the oxidation resistance of the sheathed heater alloy by regression analysis. Si, Ni, Cr, Al, La, Ce, and Y improve oxidation resistance evaluated in a cycle test repeats from room temperature to high temperature of about 1000° C. On the other hand, when the B content is large, the oxidized scale of the alloy becomes porous, so that the oxidation rate increases at high temperatures, which promotes scale growth and exfoliation. N forms AlN with Al which contributes to improving oxidation resistance, and reduces the effect of Al. In addition, S reduces the adhesion between the oxide film and the base material, causes the oxide film to drop off, and promotes oxidation. Therefore, the lower limit of these elements is set to 49.0 or more. Desirable value is 50.0 or more and more desirable value is 51.0 or more.

In the Fe—Ni—Cr alloys of the present invention having oxidation resistance, superior corrosion resistance, and weldability, the balance other than the above elements are Fe and inevitable impurities.

The method of specifying the limiting formula of the above Formula 1 is as follows.

Various alloys having a basic composition of Fe-20% Ni-20% Cr-0.5% Mo and varying the amount of addition of Ni, Cr, P, Mo, Al, and REM, and the like, were melted in a vacuum melting furnace. After hot forging, a hot forged plate of 8 mmt×80 mmw was produced. The resulting hot forged plate was subjected to solution heat treatment at 1200° C. for 10 minutes, surface grinding, cold rolling to 2 mm thickness, and solution heat treatment at 1050° C. for 1 minute. After that, it was cut into a size of 20 min×30 mm, and the surface was finished by wet polishing of #600 to obtain a test piece. The obtained test piece was subjected to pitting corrosion potential measurement with the test solution of a 3.5% NaCl solution at 70° C. which was added with 10 ml/l acetic acid, and other conforms to JIS G 0577. The potential corresponding to a current density of 100 μA cm in the anodic polarization curve was taken as the pitting potential. HZ-5000 manufactured by Hokuto Denko., Ltd. was used as an electrochemical measurement system, and a saturated calomel electrode (Sat. KCl, hereinafter referred to SCE, all potentials were based on SCE and simply expressed as V) was used as a reference electrode. Pt was used for an opposite pole. For example, 0.07V means 0.07V vs SCE.

It was found that the pitting corrosion potential obtained by pitting corrosion test is improved by addition of Ni, Cr, and Mo, and is largely reduced by addition of La, Ce, and Y, furthermore, the content of P and O also has an adverse effect. As a result of observation of the test pieces, a large amount of oxide-based inclusions of La, Ce, and Y and phosphorus compounds were present, and it was considered that these were the starting points of pitting corrosion. In addition, although the effect on the decrease in pitting potential is smaller than that of La, Ce, and Y, a large amount of Al formed spinel-type inclusions with O, which became the starting point of pitting corrosion, and caused a decrease in corrosion resistance. Therefore, it has been found that controlling La, Ce, Y, P, O, and Al is effective in preventing deterioration of corrosion resistance. In addition, since the effect of Ni, Cr, and Mo recognized in order to improve the corrosion resistance of the base material, it was found that a balance with these elements is necessary.

From the above test results, the degree of influence of the additive elements on the corrosion resistance of the sheathed heater alloy was clarified, and the relational expression of the component composition represented by Formula 1 was determined by multiple regression analysis. Assuming that the corrosion resistance that is sufficient for sheathed heaters is 0.07 V, by setting the value of Formula 1 to 20.0 or more, it was found that formation of oxides and phosphorus compounds can be suppressed, and deterioration of corrosion resistance due to La, Ce, and Y can be prevented.

The method of specifying the limiting formula of the above Formula 2 is as follows.

Various alloys having Fe-20% Ni-20% Cr-0.5% Mo as a basic composition and varying the addition amount in the same manner as above were melted in a vacuum melting furnace, hot forged, and then a hot forged plates of 8 mmt×80 mmw were produced. The resulting hot forged plates were subjected to solution heat treatment at 1200° C. for 10 minutes, surface grinding, cold rolling to 2 mm thickness, and solution heat treatment at 1050° C. for 1 minute. The sample was adjusted to a size of 2 mmt×80 mmw×200 mmL, and the oxide film formed by the heat treatment was removed by shot blasting to obtain a test piece. A bead-on welding test was performed on the test piece surface under the condition of an arc length of 2 mm, an Ar ga flow rate of 10 L/min, a welding speed of 300 mm/min, and a welding current of 100 A. A position near the welding point where the weld bead of the test piece after welding is sufficiently stable was selected, and the number of ripples (unevenness of wave pattern) with a height of 0.3 mm or more in the bead length of 30 mm or more was measured and evaluated with a color 3D laser microscope (Manufactured by Keyence Corporation, VK-9710, magnification of 100 times). The reason why the height was set to 0.3 mm is that if there is a ripple of this height or more, it will take a long time to remove it by polishing.

The above test clarified the degree of influence of the above elements on the weldability of the sheathed heater alloy, and it was found that Si, Mn, and S make ripple small and Al, Ti, O, and REM make large. From these results, regarding the cases in which the number of ripples were 3 or more, the effect of the composition obtained by multiple regression analysis is Formula 2. From this, it was found that Formula 2 must be 5.0 or more to reduce the number to less than 10, which is a level that can be removed without requiring additional polishing man-hours. Therefore, it can be evaluated that it has sufficient weldability.

The method of specifying the limiting formula of the above Formula 3 is as follows.

Various alloys having Fe-20% Ni-20% Cr-0.5% Mo as a basic composition and varying the addition amount in the same manner as above were melted in a vacuum melting furnace, hot forged, and then a hot forged plates of 8 mmt×80 mmw were produced. The resulting hot forged plates were subjected to solution heat treatment at 1200° C. for 10 minutes, surface grinding, cold rolling to 2 mm thickness, and solution heat treatment at 1050° C. for 1 minute. The sample was adjusted to a size of 2 mmt×80 mmw×200 mmL, and the oxide film formed by the heat treatment was removed by shot blasting to obtain a test piece. A bead-on welding test was performed on the test piece surface under the condition of an arc length of 2 mm, an Ar ga flow rate of 10 L/min, a welding speed of 300 mm/min, and a welding current of 100 A. A position near the welding end point where the weld bead of the welded test peace is sufficiently stable was stable, and presence or absence of coloring around the bead in the bead length of 40 mm was noted and evaluated. The weld bead was observed with a stereoscope (manufactured by Keyence Corporation, K-9710, magnification of 100 times) and evaluated by the ratio of the bead width to the colored area around the bead, and when the rate was 1.5 or less, it was considered good. If the periphery of the bead is not colored due to oxidation, only the bead can be polished, but if the coloring extends to the periphery, it is necessary to polish that area as well. For this reason, a large amount of polishing is required, that is, a large amount of time is required for removal by polishing.

Figure 3:
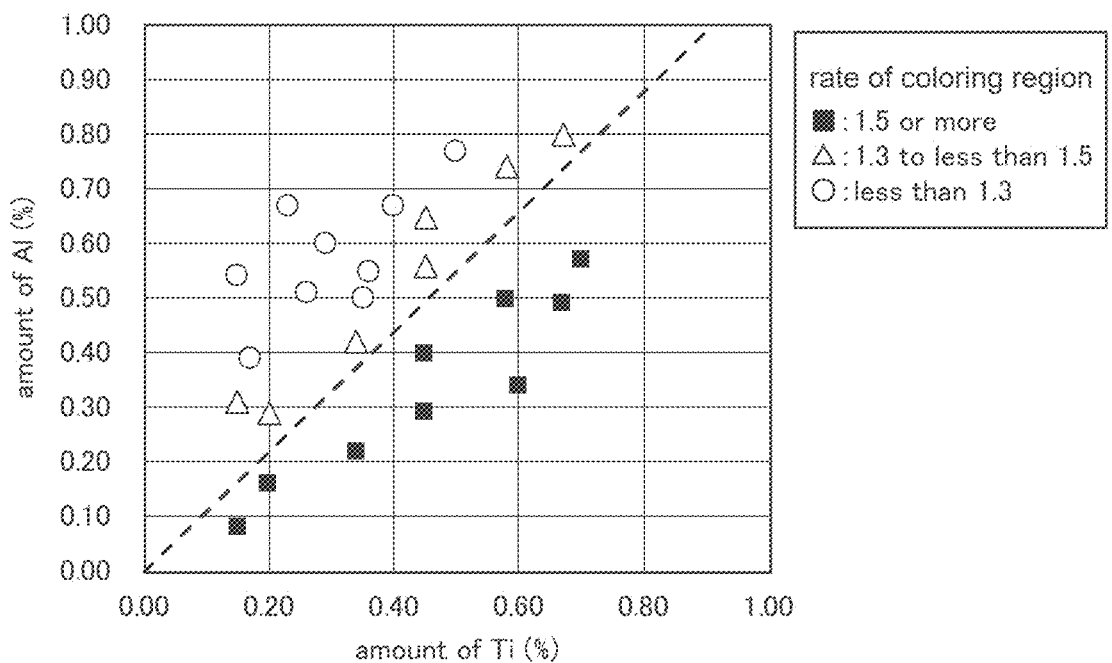
FIG. 3 is a graph showing the relationship between the amounts of Al and Ti that affect the coloring around the weld metal.
Figure 4:
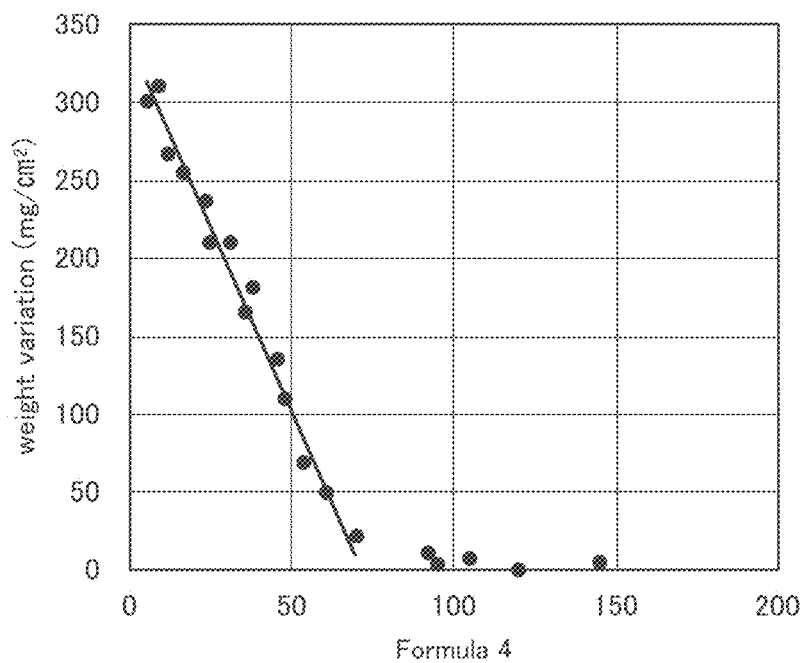
FIG. 4 is a graph showing the relationship between Formula 4 showing the effect of chemical composition on oxidation resistance and weight change.

The above test clarified the effect on the coloring of the weld bead, and it was found that controlling the amounts of addition of Al and Ti is effective for suppressing the coloring in the vicinity of the bead in the material added with REM. That is, it was found that in order to make the polishing man-hours appropriate, it is preferable to make the amount of Al slightly larger than the amount of Ti, and as shown in FIG. 3, it can be effectively suppressed by adding Al at 1.1 times or more the amount of Ti.

The method of specifying the limiting formula of the above Formula 4 is as follows.

Various alloys having Fe-20% Ni-20% Cr-0.5% Mo as a basic composition and varying the addition amount in the same manner as above were melted in a vacuum melting furnace, hot forged, and then a hot forged plates of 8 mmt×80 mmw were produced. The resulting hot forged plates were subjected to solution heat treatment at 1200° C. for 10 minutes, surface grinding, cold rolling to 2 mm thickness, and solution heat treatment at 1050° C. for 1 minute. After that, it was cut into a size of 10 mm×80 mm, and the surface was finished by wet polishing After that, it was cut into a size of 10 mm×80 mm, and the surface was finished by wet polishing of #400, and then U-bent to obtain a test piece simulating the bent portion of a sheathed heater. With respect to this, a repeated oxidation test was performed with one cycle of 1100° C.×40 minutes and room temperature×20 minutes. The rest piece after 200 cycles was evaluated by the value obtained by dividing the weight variation excluding the weight of the peeled scale by the surface area before the test. The surface area before the test is determined by measuring prior to bending.

The above test clarified the degree of influence of the additive elements on the oxidation resistance of the sheathed heater alloy. It was found that addition of Si, Ni, Cr, Al, Ti, and REM is effective, but an increase in B, N, and S deteriorate oxidation resistance. From these results, Formula 4 is obtained by multiple regression analysis of the contribution of the additive elements within the range where it can be judged that the weight variation is clearly changed to 20 mg/cm$^2$ or more. By making it 49.0 or more, the weight variation that can be judged to have sufficient oxidation resistance as a sheathed heater can be less than 100 mg/cm$^2$.

In the Fe—Ni—Cr alloy for sheathed heaters of the present invention, which is excellent in oxidation resistance, corrosion resistance, and weldability, an Fe—Ni—Cr alloy having excellent oxidation resistance evaluated by a cycle oxidation test in which high and low temperatures are repeated, and corrosion resistance in a wet environment, and smooth bead after welding.

EXAMPLES

Next, Examples of the present invention are explained, however, the present invention is not limited to the Examples as long as it does not exceed its gist.

Examples 1 to 27, Comparative Examples 1 to 16

Production of Fe—Ni—Cr alloy

First, raw materials such as scraps, nickel, chromium, and molybdenum were melt in a 60 t electric furnace, mixture gas of oxygen and argon was blown in AOD (Argon Oxygen Decarburization) or VOD (Vacuum Oxygen Decarburization) so as to perform decarburization. The lining bricks of AOD were lined with dolomite (MgO—CaO refractory). Subsequently, ferrosilicon alloy and aluminum were added to molten alloy, Cr reduction was performed, and then, limestone and fluorite were added so as to form a CaO—SiO$_2$—Al$_2$O$_3$—MgO—F based slag, deoxidation and desulfurization were performed, and then an Fe—Ni alloy containing at least one of lanthanum (La), cerium (Ce), and yttrium (Y) was added. With respect to a molten raw material of which composition has been adjusted, a slab of Fe—Ni—Cr alloy having 200 mm thickness and 1200 mm width was produced by a continuous casting method. The chemical composition of obtained alloy is shown in Table 1. It should be noted that the numerical values outside the scope of claim 1 are parenthesized.

TABLE 1

| | | C | Si | Mn | P | S | Ni | Cr | Mo | Cu | Al |
|---|---|---|---|---|---|---|---|---|---|---|---|
| Example | 1 | 0.001 | 0.18 | 0.21 | 0.029 | 0.0018 | 20.85 | 18.10 | 0.21 | 0.29 | 0.18 |
| | 2 | 0.041 | 0.19 | 0.79 | 0.027 | 0.0017 | 12.43 | 18.47 | 1.48 | 0.27 | 0.70 |
| | 3 | 0.007 | 0.98 | 0.22 | 0.026 | 0.0019 | 12.23 | 23.61 | 1.41 | 0.28 | 0.15 |
| | 4 | 0.047 | 0.96 | 0.76 | 0.026 | 0.0016 | 20.61 | 23.88 | 0.24 | 0.26 | 0.69 |
| | 5 | 0.038 | 0.93 | 0.24 | 0.024 | 0.0011 | 20.38 | 23.11 | 0.29 | 0.24 | 0.68 |
| | 6 | 0.002 | 0.91 | 0.74 | 0.022 | 0.0013 | 12.64 | 23.43 | 1.37 | 0.25 | 0.61 |
| | 7 | 0.036 | 0.21 | 0.75 | 0.023 | 0.0015 | 12.89 | 18.88 | 1.32 | 0.21 | 0.66 |
| | 8 | 0.024 | 0.31 | 0.32 | 0.016 | 0.0009 | 13.32 | 19.80 | 0.83 | 0.18 | 0.40 |
| | 9 | 0.012 | 0.82 | 0.41 | 0.011 | 0.0002 | 19.85 | 22.15 | 0.91 | 0.02 | 0.21 |
| | 10 | 0.019 | 0.44 | 0.52 | 0.020 | 0.0007 | 16.44 | 20.44 | 0.73 | 0.04 | 0.51 |
| | 11 | 0.029 | 0.51 | 0.67 | 0.014 | 0.0008 | 18.87 | 21.66 | 0.34 | 0.08 | 0.49 |
| | 12 | 0.021 | 0.63 | 0.56 | 0.004 | 0.0001 | 14.21 | 20.92 | 0.68 | 0.11 | 0.42 |
| | 13 | 0.010 | 0.56 | 0.49 | 0.019 | 0.0003 | 15.23 | 22.21 | 0.42 | 0.13 | 0.36 |
| | 14 | 0.014 | 0.72 | 0.37 | 0.008 | 0.0004 | 17.31 | 22.81 | 0.29 | 0.17 | 0.29 |
| | 15 | 0.019 | 0.29 | 0.37 | 0.020 | 0.0003 | 16.12 | 20.44 | 0.43 | 0.04 | 0.39 |
| | 16 | 0.017 | 0.21 | 0.43 | 0.027 | 0.0011 | 12.34 | 21.14 | 1.34 | 0.26 | 0.17 |
| | 17 | 0.036 | 0.61 | 0.51 | 0.011 | 0.0008 | 19.13 | 18.37 | 0.54 | 0.08 | 0.54 |

TABLE 1-continued

|  |  |  |  |  |  |  |  |  |  |  |  |
|---|---|---|---|---|---|---|---|---|---|---|---|
|  | 18 | 0.009 | 0.42 | 0.22 | 0.024 | 0.0016 | 20.72 | 23.85 | 0.22 | 0.23 | 0.69 |
|  | 19 | 0.031 | 0.38 | 0.34 | 0.017 | 0.0011 | 12.87 | 18.86 | 1.43 | 0.14 | 0.36 |
|  | 20 | 0.007 | 0.24 | 0.24 | 0.013 | 0.0007 | 20.46 | 23.24 | 0.27 | 0.21 | 0.66 |
|  | 21 | 0.004 | 0.26 | 0.34 | 0.021 | 0.0002 | 15.04 | 20.03 | 0.52 | 0.04 | 0.24 |
|  | 22 | 0.015 | 0.43 | 0.50 | 0.020 | 0.0011 | 15.82 | 20.44 | 0.73 | 0.04 | 0.48 |
|  | 23 | 0.011 | 0.86 | 0.66 | 0.007 | 0.0006 | 20.46 | 23.31 | 1.01 | 0.25 | 0.50 |
|  | 24 | 0.047 | 0.45 | 0.24 | 0.018 | 0.0014 | 19.98 | 20.19 | 0.81 | 0.22 | 0.69 |
|  | 25 | 0.026 | 0.22 | 0.26 | 0.013 | 0.0010 | 15.61 | 18.55 | 1.34 | 0.01 | 0.51 |
|  | 26 | 0.029 | 0.59 | 0.39 | 0.009 | 0.0003 | 17.33 | 19.93 | 0.73 | 0.09 | 0.37 |
|  | 27 | 0.032 | 0.63 | 0.45 | 0.002 | 0.0008 | 12.99 | 22.22 | 0.48 | 0.11 | 0.67 |
| Comparative Example | 1 | 0.016 | 0.44 | 0.52 | 0.024 | 0.0007 | 15.99 | (17.80) | 0.33 | 0.06 | (0.85) |
|  | 2 | 0.014 | 0.32 | 0.42 | 0.019 | 0.0003 | 16.31 | 20.44 | 0.64 | 0.07 | 0.51 |
|  | 3 | 0.002 | 0.41 | 0.38 | 0.020 | 0.0005 | 14.44 | 22.44 | 0.23 | 0.09 | (0.75) |
|  | 4 | 0.012 | 0.28 | 0.51 | 0.020 | 0.0007 | 12.00 | 20.44 | 0.73 | 0.08 | (0.05) |
|  | 5 | 0.016 | (0.12) | 0.35 | 0.019 | 0.0005 | 12.06 | 21.35 | 0.65 | 0.03 | 0.41 |
|  | 6 | 0.019 | 0.28 | 0.40 | 0.020 | 0.0004 | (10.30) | (17.38) | 0.73 | 0.06 | 0.41 |
|  | 7 | 0.019 | 0.28 | 0.40 | 0.020 | 0.0007 | 16.12 | 20.44 | (0.14) | 0.03 | 0.41 |
|  | 8 | 0.018 | 0.50 | 0.23 | (0.034) | (0.0125) | 13.28 | 19.65 | 0.23 | 0.05 | (0.01) |
|  | 9 | 0.007 | 0.48 | 0.31 | 0.016 | 0.0001 | 15.12 | (12.80) | 1.15 | 0.05 | 0.43 |
|  | 10 | 0.019 | (0.00) | 0.61 | 0.020 | 0.0009 | 17.26 | 20.33 | 0.65 | 0.04 | 0.19 |
|  | 11 | 0.019 | 0.29 | (0.18) | 0.020 | 0.0003 | 16.12 | 20.44 | 0.73 | 0.02 | 0.39 |
|  | 12 | 0.016 | 0.42 | 0.40 | 0.020 | 0.0007 | 17.44 | 20.44 | 0.53 | 0.11 | 0.13 |
|  | 13 | 0.004 | (0.17) | 0.29 | 0.015 | 0.0003 | (11.89) | 18.20 | 0.74 | 0.05 | (0.88) |
|  | 14 | 0.010 | (0.02) | 0.30 | 0.017 | 0.0003 | 12.33 | 20.61 | 1.23 | 0.05 | 0.43 |
|  | 15 | 0.005 | 0.45 | 0.27 | 0.019 | 0.0002 | 14.33 | 19.12 | 0.43 | 0.13 | (0.09) |
|  | 16 | 0.007 | 0.46 | 0.26 | 0.020 | 0.0004 | 15.11 | 20.14 | 0.37 | 0.10 | 0.20 |

|  |  | Ti | N | B | O | Ca | La | Ce | Y |
|---|---|---|---|---|---|---|---|---|---|
| Example | 1 | 0.11 | 0.012 | 0.0008 | 0.0029 | 0.0002 | 0.0006 | 0.0005 | 0.0000 |
|  | 2 | 0.12 | 0.014 | 0.0010 | 0.0002 | 0.0010 | 0.0030 | 0.0000 | 0.0018 |
|  | 3 | 0.13 | 0.015 | 0.0001 | 0.0028 | 0.0003 | 0.0015 | 0.0060 | 0.0072 |
|  | 4 | 0.68 | 0.014 | 0.0001 | 0.0030 | 0.0012 | 0.0000 | 0.0043 | 0.0098 |
|  | 5 | 0.16 | 0.013 | 0.0002 | 0.0003 | 0.0001 | 0.0063 | 0.0000 | 0.0075 |
|  | 6 | 0.52 | 0.003 | 0.0009 | 0.0026 | 0.0010 | 0.0000 | 0.0051 | 0.0080 |
|  | 7 | 0.18 | 0.003 | 0.0008 | 0.0027 | 0.0009 | 0.0004 | 0.0011 | 0.0000 |
|  | 8 | 0.31 | 0.010 | 0.0007 | 0.0006 | 0.0003 | 0.0010 | 0.0018 | 0.0005 |
|  | 9 | 0.53 | 0.007 | 0.0006 | 0.0002 | 0.0004 | 0.0000 | 0.0121 | 0.0000 |
|  | 10 | 0.41 | 0.012 | 0.0005 | 0.0009 | 0.0005 | 0.0000 | 0.0055 | 0.0041 |
|  | 11 | 0.34 | 0.014 | 0.0003 | 0.0021 | 0.0002 | 0.0023 | 0.0000 | 0.0018 |
|  | 12 | 0.22 | 0.009 | 0.0002 | 0.0011 | 0.0002 | 0.0028 | 0.0030 | 0.0000 |
|  | 13 | 0.27 | 0.011 | 0.0003 | 0.0018 | 0.0002 | 0.0041 | 0.0012 | 0.0016 |
|  | 14 | 0.18 | 0.010 | 0.0004 | 0.0014 | 0.0002 | 0.0082 | 0.0000 | 0.0000 |
|  | 15 | 0.61 | 0.012 | 0.0005 | 0.0030 | 0.0013 | 0.0000 | 0.0097 | 0.0000 |
|  | 16 | 0.67 | 0.003 | 0.0001 | 0.0011 | 0.0013 | 0.0035 | 0.0028 | 0.0002 |
|  | 17 | 0.36 | 0.011 | 0.0008 | 0.0002 | 0.0013 | 0.0123 | 0.0000 | 0.0000 |
|  | 18 | 0.11 | 0.013 | 0.0007 | 0.0006 | 0.0018 | 0.0000 | 0.0019 | 0.0000 |
|  | 19 | 0.31 | 0.012 | 0.0002 | 0.0026 | 0.0008 | 0.0000 | 0.0000 | 0.0143 |
|  | 20 | 0.14 | 0.014 | 0.0009 | 0.0004 | 0.0012 | 0.0019 | 0.0024 | 0.0035 |
|  | 21 | 0.20 | 0.007 | 0.0001 | 0.0011 | 0.0005 | 0.0051 | 0.0000 | 0.0000 |
|  | 22 | 0.45 | 0.014 | 0.0008 | 0.0009 | 0.0002 | 0.0008 | 0.0005 | 0.0002 |
|  | 23 | 0.12 | 0.014 | 0.0005 | 0.0002 | 0.0009 | 0.0040 | 0.0016 | 0.0019 |
|  | 24 | 0.58 | 0.010 | 0.0005 | 0.0014 | 0.0002 | 0.0018 | 0.0059 | 0.0069 |
|  | 25 | 0.40 | 0.005 | 0.0004 | 0.0006 | 0.0004 | 0.0047 | 0.0009 | 0.0005 |
|  | 26 | 0.12 | 0.009 | 0.0009 | 0.0020 | 0.0003 | 0.0079 | 0.0025 | 0.0024 |
|  | 27 | 0.49 | 0.010 | 0.0007 | 0.0011 | 0.0006 | 0.0045 | 0.0048 | 0.0044 |
| Comparative Example | 1 | 0.41 | 0.014 | 0.0005 | (0.0001) | (0.0030) | 0.0043 | 0.0037 | 0.0069 |
|  | 2 | 0.41 | 0.010 | 0.0005 | 0.0009 | 0.0003 | 0.0024 | 0.0056 | 0.0048 |
|  | 3 | 0.12 | 0.011 | 0.0005 | (0.0001) | (0.0026) | 0.0055 | 0.0042 | 0.0031 |
|  | 4 | (1.02) | 0.012 | 0.0006 | (0.0084) | 0.0000 | 0.0026 | 0.0025 | 0.0046 |
|  | 5 | 0.42 | (0.025) | 0.0005 | 0.0021 | 0.0007 | 0.0000 | 0.0040 | 0.0027 |
|  | 6 | 0.61 | 0.012 | 0.0005 | 0.0026 | 0.0002 | 0.0014 | 0.0035 | 0.0025 |
|  | 7 | 0.61 | 0.012 | 0.0005 | 0.0025 | 0.0002 | 0.0011 | 0.0061 | 0.0010 |
|  | 8 | 0.55 | 0.007 | 0.0004 | (0.0050) | 0.0002 | 0.0000 | 0.0000 | 0.0028 |
|  | 9 | 0.62 | 0.004 | 0.0001 | 0.0014 | 0.0002 | (0.0071) | (0.0031) | (0.0050) |
|  | 10 | 0.17 | 0.008 | 0.0002 | 0.0014 | 0.0002 | 0.0014 | 0.0000 | 0.0021 |
|  | 11 | 0.61 | 0.012 | 0.0005 | 0.0027 | 0.0002 | 0.0016 | 0.0073 | 0.0000 |
|  | 12 | (0.72) | (0.020) | 0.0004 | 0.0018 | 0.0001 | 0.0050 | 0.0033 | 0.0030 |
|  | 13 | 0.69 | 0.003 | 0.0001 | (0.0001) | (0.0034) | (0.0006) | (0.0000) | (0.0003) |
|  | 14 | 0.61 | 0.012 | (0.0012) | 0.0012 | 0.0002 | 0.0000 | 0.0000 | 0.0021 |
|  | 15 | 0.26 | 0.003 | 0.0001 | (0.0056) | 0.0001 | 0.0000 | 0.0042 | 0.0000 |
|  | 16 | (0.08) | 0.003 | 0.0001 | 0.0021 | 0.0001 | 0.0026 | 0.0000 | 0.0000 |

The surfaces of the obtained slabs were each ground by 3 to 5 mm, the slab was heated at 1000 to 1300° C., and was hot-rolled to make a hot rolled strip having a thickness of 3 mm, and annealing, acid washing, and cold-rolling were performed to make an alloy strip having thickness of 1 mm, and then, further annealing and acid washing were performed to make a cold-rolled annealed strip as a test piece. Table 2 shows the composition of each sample obtained and the values obtained from the above Formula (1) to (4)

Each sample obtained was evaluated as follows, and the results are shown in Table 2.

(1) Corrosion Resistance Evaluation

Each sample obtained was cut into a size of 20 mm×30 mm, and the surface was finished by wet polishing of #600 to obtain a test piece. With respect to the test piece obtained, with a test solution in which 10 ml/l of acetic acid was added to a 3.5% NaCl solution at 70° C., pitting corrosion potential was measured according to JIS G 0577, and the potential corresponding to a current density of 100 μA cm$^{-2}$ in the anodic polarization curve was taken as the pitting potential V. The pitting potential V was evaluated such that less than 0.07 V was defective (D), 0.07 V or more and less than 0.10 V was acceptable (C), 0.10 V or more and less than 0.15 V was good (B), and 0.15 V or more was excellent (A).

(2) Weldability Evaluation

Each obtained sample adjusted to 2 mmt×80 mmw×200 mmL, and the oxide film formed by the heat treatment was removed by shot blasting to obtain a test piece. Two test pieces were subjected to bead-on welding test on the surface of the test piece under the conditions of an arc length of 2 mm, an Ar gas flow rate of 10 L/min, a welding speed of 300 mm/min, and a welding current of 100 A. A portion near the welding end point where the weld bead of the test piece after welding is sufficiently stable was selected, and the number of ripples (wave pattern unevenness) with a height of 0.3 mm or more in the bead length of 30 mm was measured, and the number of ripples in a total of 60 mm was evaluated in two test pieces. It was evaluated such that 10 or more ripples were confirmed as defective (D), 5 or more and less than 10 were acceptable (C), 2 or more and less than 5 were confirmed as good (B), and less than 5 were confirmed as excellent (A).

(3) Colorability Evaluation

Each obtained sample was adjusted to 2 mmt×80 mmw× 200 mm L, and the oxide film formed by the heat treatment was removed by shot blasting so as to obtain a test piece. Two test pieces were subjected to bead-on welding test on the surface of the test piece under the conditions of an arc length of 2 mm, an Ar gas flow rate of 10 L/min, a welding speed of 300 mm/min, and a welding current of 100 A. A portion near the welding end point where the weld bead of the test piece after welding is sufficiently stable was selected, a bead length of 40 mm to be evaluated, and two test pieces were evaluated based on the ratio of the bead width to colored area around the bead in a total of 80 mm. It was evaluated such that the obtained ratio of 1.5 or more was defective (D), 1.3 or more and less than 1.5 was acceptable (C), 1.1 or more and less than 1.3 was good (B), and less than 1.1 was excellent (A).

(4) Oxidation Resistance Evaluation

Each obtained sample was cut into a size of 20 mm×30 mm, and the surface was finished by wet polishing of #400 to obtain a test piece. A repeated oxidation test was performed with one cycle of 1100° C.×40 minutes and room temperature×20 minutes. The test piece after 200 cycles was evaluated by the value (mg/cm$^2$) obtained by dividing the weight variation, excluding the weight of the peeled scale, by the surface area before the test. Surface area before the test is determined by measuring the dimensions prior to bending. It was evaluated such that the weight loss of 100 mg/cm$^2$ or more was defective (D), the weight loss of 60 mg/cm$^2$ or more and less than 100 mg/cm$^2$ was acceptable (C), the weight loss of 30 mg/cm$^2$ or more and less than 60 mg/cm$^2$ was good (B), and the weight loss of less than 30 mg/cm$^2$ was excellent (A).

(5) Compound Identification and Area Ratio

Obtained annealed material with a thickness of 1 mm was cut to prepare a buried sample so that the cross section can be observed, it was wet polished, and finally buffed to a mirror finish for observation. The compound was identified by observing it with an FE-SEM and analyzing it with the attached EDS. The area ratio was obtained from an SEM image observed at a magnification of ×8000. The observation area was set to 0.05 mm$^2$, and the length of two sides of the lumpy compound was measured and approximated to a circle to determine its area. For a linear compound, the long side and short side were measured, and the area was determined as a rectangle. Since the short side varies greatly, five measurements were taken and the average was used as the short side of the compound. This was evaluated as the area ratio of the compound with respect to the observed area of 0.05 mm$^2$. It is preferable that the area ratio is 0.50% or less.

TABLE 2

|  |  | Formula 1 | Formula 2 | Formula 3 | Formula 4 | corossion resistance | weldability | coloring | oxidation resistance | area ratio of compounds |
|---|---|---|---|---|---|---|---|---|---|---|
| Example | 1 | 29.6 | 8.8 | 0.06 | 49.1 | A | B | C | C | 0.48 |
|  | 2 | 27.3 | 7.2 | 0.57 | 54.4 | A | B | A | C | 0.14 |
|  | 3 | 27.3 | 33.6 | 0.01 | 107.0 | B | A | C | A | 0.49 |
|  | 4 | 25.8 | 31.9 | −0.06 | 124.4 | C | A | D | A | 0.51 |
|  | 5 | 27.9 | 30.4 | 0.50 | 121.1 | B | A | A | A | 0.14 |
|  | 6 | 26.1 | 30.4 | 0.04 | 111.1 | B | A | C | A | 0.37 |
|  | 7 | 27.4 | 9.3 | 0.46 | 48.3 | A | B | A | C | 0.38 |
|  | 8 | 29.8 | 11.4 | 0.06 | 53.7 | A | B | C | C | 0.16 |
|  | 9 | 32.7 | 28.2 | −0.37 | 113.9 | A | A | D | A | 0.08 |
|  | 10 | 27.0 | 12.5 | 0.06 | 90.9 | B | B | B | A | 0.22 |
|  | 11 | 31.2 | 19.1 | 0.12 | 67.9 | A | B | A | B | 0.39 |
|  | 12 | 29.4 | 22.2 | 0.18 | 71.6 | A | A | A | B | 0.22 |
|  | 13 | 29.1 | 18.8 | 0.06 | 78.0 | A | A | B | A | 0.33 |
|  | 14 | 30.9 | 24.9 | 0.09 | 88.4 | A | A | C | A | 0.27 |
|  | 15 | 24.2 | 5.0 | −0.28 | 91.3 | C | B | D | A | 0.50 |
|  | 16 | 30.9 | 5.6 | −0.57 | 75.6 | A | C | D | B | 0.17 |

TABLE 2-continued

|  |  | Formula 1 | Formula 2 | Formula 3 | Formula 4 | corossion resistance | weldability | coloring | oxidation resistance | area ratio of compounds |
|---|---|---|---|---|---|---|---|---|---|---|
|  | 17 | 24.4 | 18.1 | 0.14 | 106.5 | C | A | B | A | 0.11 |
|  | 18 | 36.1 | 17.5 | 0.57 | 61.7 | A | A | A | B | 0.18 |
|  | 19 | 21.5 | 7.5 | 0.02 | 105.4 | C | B | C | A | 0.44 |
|  | 20 | 32.3 | 5.1 | 0.51 | 89.4 | A | C | A | A | 0.16 |
|  | 21 | 29.0 | 7.5 | 0.02 | 69.1 | A | C | C | B | 0.20 |
|  | 22 | 31.9 | 17.7 | −0.02 | 47.3 | A | A | D | C | 0.23 |
|  | 23 | 36.4 | 31.7 | 0.37 | 88.4 | A | A | A | A | 0.14 |
|  | 24 | 24.4 | 9.8 | 0.05 | 123.5 | C | B | B | A | 0.27 |
|  | 25 | 29.0 | 5.7 | 0.07 | 75.2 | A | C | B | B | 0.12 |
|  | 26 | 24.8 | 16.4 | 0.24 | 107.8 | C | B | A | A | 0.34 |
|  | 27 | 23.4 | 17.4 | 0.13 | 109.3 | C | A | A | A | 0.23 |
| Comparative | 1 | (17.5) | 8.8 | 0.40 | 113.7 | D | B | B | A | 0.52 |
| Example | 2 | 24.6 | (4.8) | 0.06 | 108.4 | B | D | C | A | 0.20 |
|  | 3 | 24.1 | 8.9 | 0.62 | 106.8 | D | B | A | A | 0.51 |
|  | 4 | (19.1) | (4.6) | −1.07 | 83.1 | D | D | D | A | 1.21 |
|  | 5 | 28.5 | (0.5) | −0.05 | 60.2 | D | D | D | B | 0.52 |
|  | 6 | (19.8) | 8.3 | −0.26 | 68.7 | D | C | D | D | 0.44 |
|  | 7 | 24.5 | 6.2 | −0.26 | 83.5 | D | C | D | B | 0.43 |
|  | 8 | 24.7 | 36.1 | −0.60 | 38.6 | D | A | D | D | 0.92 |
|  | 9 | (14.6) | 9.3 | −0.25 | 115.8 | D | B | D | A | 0.55 |
|  | 10 | 32.1 | (−0.7) | 0.00 | 63.0 | A | D | C | B | 0.25 |
|  | 11 | 26.0 | 5.3 | −0.28 | 87.4 | B | D | D | B | 0.46 |
|  | 12 | 26.9 | 10.5 | −0.66 | 94.2 | D | B | D | A | 0.59 |
|  | 13 | 26.2 | (4.9) | 0.12 | 48.9 | B | D | B | D | 0.04 |
|  | 14 | 31.6 | (−1.3) | −0.24 | 46.1 | B | D | D | D | 0.26 |
|  | 15 | 24.0 | 15.3 | −0.20 | 64.9 | D | A | D | D | 0.77 |
|  | 16 | 29.5 | 17.6 | 0.11 | 59.2 | A | B | B | D | 0.30 |

From Table 2, Examples 1 to 27 conforming to the present invention showed good results in all of corrosion resistance, weldability, and oxidation resistance. They are suitable for sheathed heaters.

In contrast, since Comparative Examples 1 to 16 did not satisfy the scope of the present invention, they were evaluated as D in each test. In particular, heater corrosion progresses rapidly once it occurs, and there is a risk of electric shock in a wet environment. In addition, if the weldability is poor, the heater itself cannot be manufactured. Therefore, emphasis was placed on corrosion resistance and weldability, and when properties were not obtained, they were classified as comparative examples. Similarly, since the oxidation resistance is also related to the life of the product itself equipped with a heater, when the characteristics could not be obtained, they were classified as comparative examples. On the other hand, since colorability does not significantly degrade the properties of the heater itself, even if it was evaluated as D, if the corrosion resistance, the weldability, and the oxidation resistance were not evaluated as D, they were classified as examples.

In Comparative Example 1, Cr, which is most effective for corrosion resistance, did not satisfy the scope of the present invention and Formula 1 was not satisfied, so that the corrosion resistance evaluation was D. In addition, the Al content was higher than range of the invention, and deoxidation acted strongly to form Ca oxides, which also contributed to deterioration of corrosion resistance.

Comparative Example 2 did not satisfy Formula 2, and a large number of ripples occurred during welding, resulting in D evaluation.

In Comparative Example 3, since the Al content was higher than the range of the invention, Al nitrides were formed, and since deoxidation acted strongly, Ca oxides were formed, and the corrosion resistance evaluation was D.

In Comparative Example 4, since the Al content was lower than the range of the invention, deoxidation was insufficient and a large amount of oxides were formed. In addition, since the Ti content was higher than the range of the invention, a large number of Ti nitrides were formed. Furthermore, both Formulas 1 and 2 were not satisfied, and both corrosion resistance and weldability were evaluated as D.

In comparative Example 5, since the Si content was lower than the range of the invention and Formula 5 was not satisfied, weldability evaluation was D. Since the N content was higher than the range of the invention and Ti nitrides were formed, both the corrosion resistance evaluation and the oxidation resistance evaluation were D.

In comparative Example 6, since the Ni content and the Cr content were lower than the range of the invention, Formula 1 was not satisfied and the corrosion resistance evaluation was D. Although Formula 4 was satisfied, the oxidation resistance was evaluated also as D because of the low Cr content.

In Comparative Example 7, although Formula 1 was satisfied, the corrosion resistance evaluation was D because the Mo content was lower than the range of the invention.

On Comparison Example 8, since the P content and the S content were higher than the range of the invention and the Al content was low, deoxidation was poor and the O content was higher than the range of the invention. Therefore, phosphorus compounds, suffer compounds, and oxides increased, and the corrosion resistance evaluation was D. In addition, since the Al content was lower than the range of the invention, the oxidation resistance evaluation was also D.

In Comparative Example 9, the Cr content was lower than the range of the invention and did not satisfy Formula 1, and addition amount of REM was higher than the range of the invention, so that REM oxides increased and the corrosion resistance evaluation was D In comparative Example 10, since the Si content was lower than the range of the invention and Formula 2 was not satisfied, so that the weldability evaluation was D.

In Comparative Example 11, since the Mn content was lower than the range of the invention and weld cracks occurred, the weldability evaluation was D.

In Comparative Example 12, both the Ti content and the N content were higher than the range of the invention, and Ti nitrides were formed, so that the corrosion resistance evaluation was D.

In Comparative Example 13, the Si content was lower than the range of the invention, the Al content was higher, and Formula 2 was not satisfied, so that the weldability evaluation was D. In addition, since the addition amount of REM was lower tan the range of the invention, the corrosion resistance evaluation was also D.

In Comparative Example 14, the Si content was lower than the range of the invention and Formula 2 was not satisfied, so that the weldability evaluation was D. In addition, since B was added beyond the range of the invention, the oxidation resistance evaluation was also D.

In Comparison Example 15, the Al content was lower than the range of the invention, so that deoxidation was poor and the O content was higher than the range of the invention. As a result, oxides were formed and the corrosion resistance evaluation was D. In addition, since the Al content was lower than the range of the invention, the oxidation resistance evaluation was also D.

In Comparative Example 16, the Ti content was lower than the range of the invention, and the oxide film was brittle, so that the oxidation resistance evaluation was D.

INDUSTRIAL APPLICABILITY

The present invention can provide an Fe—Ni—Cr alloy for sheathed heaters, which is excellent in Oxidation resistance, corrosion resistance, and weldability, and a method for producing the same.

The invention claimed is:

1. An Fe—Ni—Cr alloy consisting of:
in weight %, C: 0.001 to 0.050%, Si: 0.18 to 1.00%, Mn: 0.20 to 0.80%, P: 0.030% or less, S: 0.0001 to 0.002%, Ni: 12 to 21%, Cr: 18 to 24%, Mo: 0.20 to 1.50%, Cu: 0.30% or less, Al: 0.10 to 0.70%, Ti: 0.10 to 0.70%, N: 0.002 to 0.015%, B: 0.0001 to 0.0010%, O: 0.0002 to 0.003%, Ca: 0.002% or less, total amount of at least one of La, Ce, and Y: 0.0010 to 0.0120%, Fe as a remainder, and inevitable impurities including Mg,
wherein the composition satisfies the following Formulas 1 and 2 (in Formulas, the notation of each element means the content (by weight %) of the element in the Fe based alloy)

$$0.575Ni + 1.25Cr + 3.43Mo - 39P - 5.3Al - 641 \text{ (at least one of La, Ce, and Y)} - 1018O \geq 20.0 \quad \text{(Formula 1)}$$

$$1.5Mn + 41.3Si + 1469S - 1.67Al - 1.34Ti - 150O - 620 \text{ (at least one of La, Ce, and Y)} \geq 5.0 \quad \text{(Formula 2)}.$$

2. The Fe—Ni—Cr alloy according to claim 1, wherein the alloy contains oxides of at least one of La, Ce, and Y, Ti nitrides, Ti carbonitrides, Ca—Al oxides, and Mg oxides, and the area ratio in any cross section of the alloy is 0.50% or less.

3. The Fe—Ni—Cr alloy according to claim 1, wherein the composition satisfies the following Formulas 3 and 4 (in Formulas, the notation of each element means the content (by weight %) of the element in the Fe based alloy)

$$Al - 1.1Ti \geq 0 \quad \text{(Formula 3)}$$

$$0.4 Si + 1.7 Ni + 1.1Cr + 5.4 Al + 3.2 Ti + 4923 \text{ (at least one of La, Ce, and Y)} - 2425B - 744N - 1213S \geq 49.0 \quad \text{(Formula 4)}.$$

4. A producing method for the Fe—Ni—Cr alloy according to claim 1, the method comprising:
adjusting composition of the alloy by smelting after dissolving an alloy raw material,
the smelting comprising:
decarburizing by blowing a mixture gas of oxygen and argon to a dissolved alloy raw material, thereby controlling nitrogen concentration at 0.002 to 0.015 weight %;
performing reduction of chromium to metallic form;
adding aluminum, limestone, and fluorite to the molten alloy, thereby forming CaO—$SiO_2$—$Al_2O_3$—F based slag and adjusting oxygen concentration at 0.0002 to 0.0030 weight %; and
adding at least one of La, Ce, and Y to the molten alloy.

5. A sheathed heater comprising a cladding tube consisting of the Fe—Ni—Cr alloy according to claim 1.

* * * * *